May 13, 1958     M. E. HENCHOZ ET AL     2,834,874
VEHICLE HEADLIGHT WITH MOVABLE SCREEN
Filed March 31, 1954     3 Sheets-Sheet 1
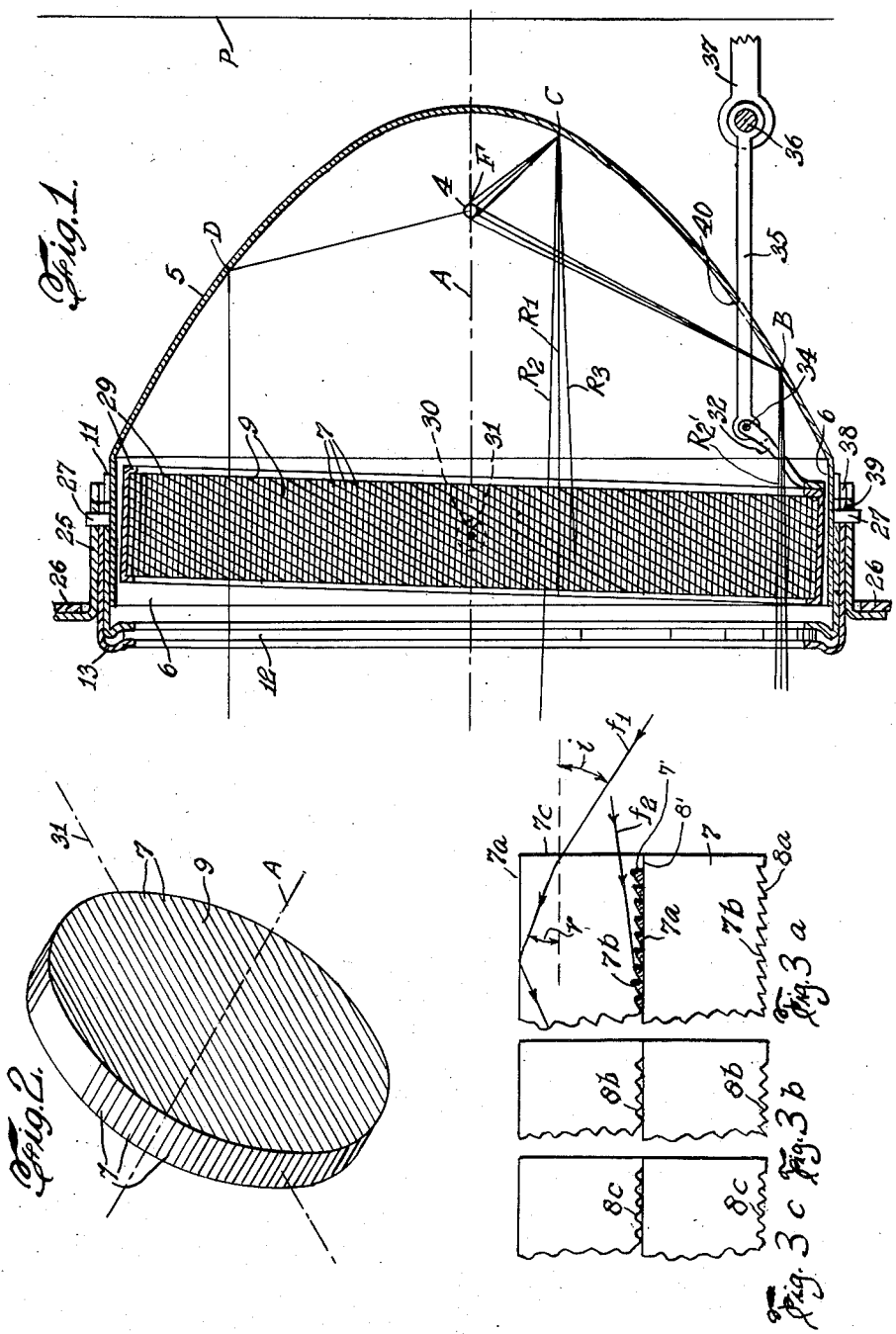

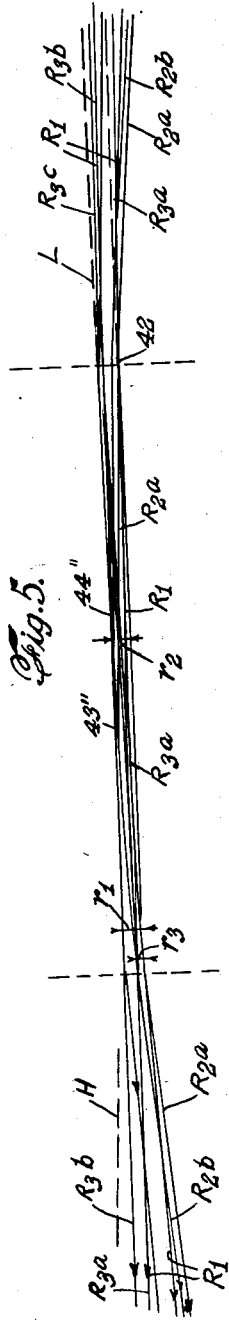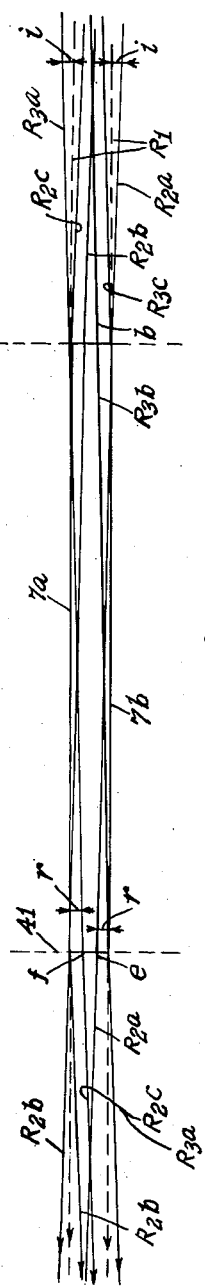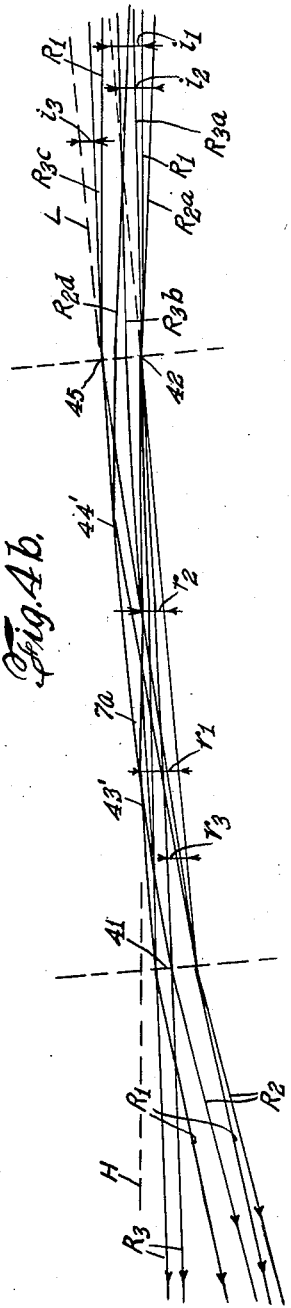

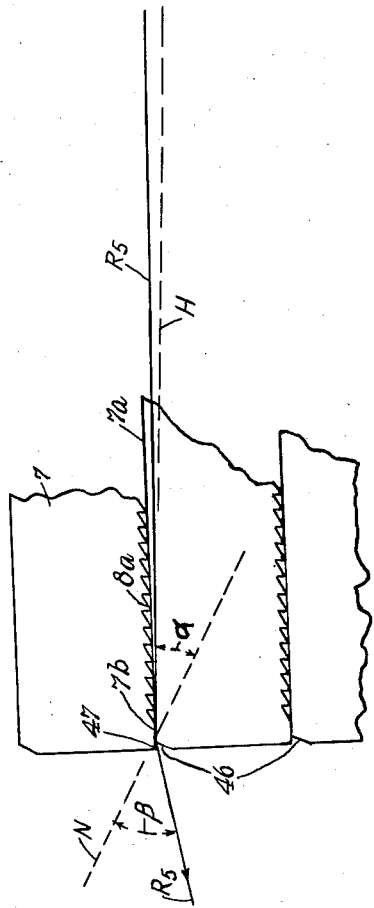

United States Patent Office 2,834,874
Patented May 13, 1958

2,834,874

VEHICLE HEADLIGHT WITH MOVABLE SCREEN

Marcel Edouard Henchoz and Edmond Theophile Dégallier, Lausanne, Switzerland

Application March 31, 1954, Serial No. 420,142

Claims priority, application Switzerland April 1, 1953

8 Claims. (Cl. 240—46.07)

The present invention relates to a vehicle headlight and is more particularly concerned with an adjustable headlight.

In accordance with the invention there is provided a headlight which comprises a parabolic reflector, a source of light positioned at least approximately at the focus of the reflector, and means for modifying the beam of light rays emitted for the purpose of reducing the blinding or glaring effect produced by the beam upon the driver of an approaching vehicle while still providing adequate illumination ahead of the vehicle upon which the headlight is mounted.

The invention will be more particularly described with reference to the appended drawings, wherein:

Fig. 1 is a vertical sectional view taken through the axis of a headlight embodying features of the present invention;

Fig. 2 is a perspective view of the adjustable light-beam directing element of the headlight shown in Fig. 1, the element having, however, a smaller circumference than the corresponding element in Fig. 1 but the other relative dimensions being not at the same scale.

Fig. 3a is a fragmentary view on an enlarged scale of one form of the blades or lamina which make up the light-beam directing element shown in Fig. 1 and Fig. 2;

Fig. 3b is a similar view of a modified form of the lamina;

Fig. 3c is a like view of a further modified form of lamina;

Fig. 4a is an enlarged view showing one of the laminae of the element shown in Figs. 1 and 2, with the paths of the light rays being indicated diagrammatically;

Fig. 4b is a similar view showing the paths taken by the light rays when the inclination of the lamina shown in Fig. 4a is changed;

Fig. 5 is a view similar to that shown in Figs. 4a and 4b illustrating the paths of the rays through a lamina of modified proportions;

Fig. 6 is a fragmentary detailed view of an assembly of laminae having a modified form;

Fig. 7a is an elevational view of a modified form of light filament with associated reflectors, and Fig. 7b is an end view of the arrangement shown in Fig. 7a.

Referring to the drawings, and more particularly to Fig. 1, the headlight illustrated comprises a parabolic reflector 5 at the focus F of which there is positioned the filament 4 of a lamp, the details of the lamp not being shown. It will be understood that in view of the fact that the filament has dimensions which are greater than zero, the beam of light rays emitted by the filament and reflected by the reflector 5 will contain, in addition to rays which are parallel to the optical axis, ascending and descending rays as well. The amount of divergence of the total beam of the reflected rays which is of necessity not only upwardly and downwardly but also toward the sides, depends on the dimensions of the filament and on its position relatively to the focus F. The distance of focus F to a plane P which is perpendicular to the axis A of the headlight defines the generatrix of the parabola of the reflector, providing the distances from the focus to all of the points of the parabola are equal to the distances from the plane P to these same points.

In the vertical plane of Fig. 1 the maximum divergence can be expressed by the angle through which the rays from the filament coil 4 are viewed from a point C of the reflector 5, a point assumed to be on the smallest circumference which the filament can, in practice, illuminate when a section of the base of the paraboloid reflector is removed to permit passage of the lamp socket. The diameter of the filament coil is, in the embodiment illustrated, $\frac{1}{15}$ of the vectoral ray F—C. The filament is, therefore, viewed from the point C through an angle of $\frac{1}{15}$ of a radian or 3 deg. 49 min. This value is sufficiently small to make possible the application of Lambert's law to the effect that the filament viewed from the point C would present a uniform luminous intensity, that is to say, that its luminous flux per unit surface would appear to be the same on the periphery of the beam reaching point C as it would be in the middle.

Thus the beam of rays reflected by each of the points of the reflector, such as C, contains a horizontal ray $R_1$ and two maximum divergent rays, $R_2$ upwardly and $R_3$ downwardly, and it can be assumed that between these extreme rays the intensity of the light flux is uniform. But all of the circumferential portions of the reflector other than the one which contains the point C being farther removed from the focus F, such as those which contain the points B and D, the rays reflected at these points are less divergent than the one which comes from the point C, which fact is of importance to the functioning of the elements of the headlight to be described below, which elements are intended to prevent the blinding or dazzling of the drivers of approaching vehicles.

A cylindrical extension 6 projects in front of the reflector 5 and to extension 6 there is secured a frame 11 which supports the headlight glass 12 and supports a second frame 13 externally of the glass. In the annular portion of the reflector formed by the cylindrical extension 6 there is disposed a rigid disk or circular block 9 of a compound laminated construction, to be described below, and this disk is mounted in such manner that it can be inclined to varying degrees by rotation about a horizontal axis 31 intersecting the axis A, suitable pivots, not shown, being provided in the extension 6 and engaged in blind holes 30 in the disk 9. The disk 9 is formed from a series of strips, plates or laminae 7 of a transparent, solid material, e. g. a resinous material such as the polyacrylic resins known as "Plexiglas" and "Lucite." The lamina 7 are positioned one on top of another to form a solid block, and the assembled laminae have the general configuration of a circular disk as shown in Fig. 2. The disk 9 is disposed in an annular mounting or frame 29 in such manner that the lateral edges of the laminae 7 form the front and back faces of the disk and are parallel to the axis 31. In the embodiment, illustrated, therefore, the cross section of each lamina is rectangular, but it could be in the form of a slightly-oblique parallelogram.

The upper faces 7a of the laminae are polished to provide a mirror-like reflecting surface while the lower faces are scratched, furrowed or ridged along lines parallel to the axis 31 so that they will not reflect but will diffuse the rays which strike them. These ridges are obtained by a substantially uniform cutting or shaping of the lower faces of the transparent laminae to give a corrugated effect which may have a cross-sectional form such as such, for example, in Figs. 3a, 3b and 3c. The corrugation 8a shown in Fig. 3a has a ratchet-like appearance, the flanks of each ridge being turned toward the interior of the headlight. The voids or open spaces between the apices of the ridges have a triangular cross-section and the acute angle of the triangle is represented in Fig. 3a as 30° but this angle can be at least as small as the inclination of the most strongly inclined rays issuing from the reflector. The teeth 8b of the furrowed surface shown in Fig. 3b are of equilateral cross-sectional form, whereas the teeth 8c shown in Fig. 3c are of a sinusoidal form.

An arm 32, secured to the annular frame 29, extends interiorally of the reflector 5 and is articulated at 34 to an arm 35 which in turn is articulated at its end to a horizontal shaft 36, which is supported by a member 37. The shaft 36 extends to the second headlight of the vehicle (not shown) and is similarly connected to a corresponding arm 35 of the second headlight. The second headlight is, of course, of the same construction as the above-described first headlight. The shaft 35 enters the headlight through a slot 40 in the reflector 5 and the member 37 is mounted for horizontal reciprocation and may be guided in a slideway or the like and connected kinematically with an operating lever or rod positioned within reach of the driver in order that the driver may change the inclination of the disk 9 in either direction at will. Alternatively, this actuating arrangement may comprise a flexible cord or cable instead of the illustrated train of connecting rods and levers.

Each of the studs 27 projecting from the periphery of the extension 6 of the reflector 5 engage in slots 38 and ramps 39 formed in the frames 11 and 13 for securing the frames to the reflector. The studs also pass through a flanged hoop 25, the flange of which is fastened to the edge 26 of a portion of the body of the vehicle, being received in a circular opening formed in this body portion. The fastening bolts (not shown) on the edge 26 suitably engage in oblong holes in the form of circular arcs which make possible the adjustment of the horizontal position of the axis 31.

In Figs. 1, 4a and 4b the width of each of the laminae 7, measured from the front to the back of the block 9 is fifteen times its thickness, and generally speaking, widths of fourteen to forty, more particularly fourteen to the thickness are particularly suitable. Consequently, in the embodiment illustrated, the diagonals of a cross section of a lamina form with the faces of the lamina angles of $1/15$ of a radian, the angle equal to that through which the filament 4 is viewed from the point C, and equal to twice the inclination of the maximum divergent rays $R_2$ and $R_3$, which amounts to $1/30$ of a radian.

For a fuller understanding of the course of the light rays shown in Fig. 4 it is first necessary to consider Fig. 3a, in which there is illustrated one form of the corrugated or ridged faces 7b as well as the course of rays $f_1$ and $f_2$, the inclinations of which have been greatly exaggerated in order more clearly to show the refraction. It is to be noted that the lateral edges 7c of the laminae are not only plane but are polished as perfectly as possible. They can therefore be traversed by the light without causing the light to undergo any appreciable diffusion so that a ray $f_1$ striking the lamina at 7c will enter the lamina in a given direction. If angle of incidence of the ray is $i$, its angle of refraction $r$ is such that $\sin r = (\sin i)/(1.42)$, where 1.42 is the index of refraction of the material forming the laminae relatively to the index of refraction of air. The maximum value of the angle of refraction for this particular material, therefore, is such that $\sin r = 1/1.42$, which corresponds to an angle of about 44 deg. 37 min. 20 sec. Since this angle is less than 45 deg., all of the rays which fall on the face 7c at an angle of the same size as the angle designated $i$ and which can after their refraction reach the face 7a undergo against this face total reflection, this face being a surface of separation between two media whose indices of refraction differ sufficiently from each other, as is the case when the lamina are formed from the polyacrylic resin "Plexiglas" which has an index of 1.42 relatively to the air imprisoned in the voids of the corrugations 8a. There is even greater reason for the total reflection of the rays of very small inclination coming from the reflector, and this is possible even if a glue is interposed between the laminae, provided that its index of refraction is sufficiently small.

There is shown in Fig. 3a a ray $f_2$ which, after refraction, is arrested by the face 7b where it is diffused by the flanks of the teeth which have been left rough by the shaping of the corrugations. This ray could also be absorbed more or less completely by the face 7b if a black or dark material 7' were interposed in the spaces or voids between the teeth or ridges of the corrugations.

In Figs. 4a, 4b and 5, wherein, for simplicity of illustration, the corrugation of the lower faces is not represented, it is understood that the rays which strike these faces on the inside are arrested or diffused as would be the case in practice with corrugated laminae.

In the horizontal position of the lamina, as shown in Fig. 4a, all of the horizontal rays $R_1$ pass through the lamina directly. The rays $R_2$ and $R_3$ of maximum inclination strike the lamina at angles $i$ which are equal to $1/30$ radian but in the opposite direction. In penetrating into the lamina they are refracted and form with faces 7a and 7b equal angles $r$ which, expressed in radians, have a value $r = (1/30)(1.1.42) = 1/42.6$.

Thus those of these rays which penetrate into the lamina and just graze the lower and the upper sharp-edges of the ridges emerge from the lamina at the points $e$ and $f$, the distances of which to the lower and to the upper face are equal and are 42.6 times smaller than the wide of the lamina. Since the width of the lamina is 15 times greater than its thickness, this distance is $42.6/15 = 2.84$ times smaller than the thickness, of which, therefore, it is the fraction $1/2.84 = 0.352$.

In the drawing, $R_2a$ are those of the rays $R_2$ which strike the base of the lamina. From this it follows that the point $e$, the distance of which to the upper edge of the lamina is the fraction $1 - 0.352 = 0.648$ of the thickness, marks the lower limit of a group of rays $R_2$ which traverse the lamina directly and have at their emergence their initial inclination, in view of the fact that the faces of entrance and emission of the lamina are parallel. The upper limit of this group of rays is defined by a ray $R_2b$. It is the latter which is refracted in the lamina in a line parallel to the internal path of the ray $R_2a$ and emerges at the upper corner of the emission face 41.

Another group of rays $R_2$, having a thickness which is the fraction 0.35 of the thickness of the lamina, is comprised between the rays $R_2b$ and $R_2c$. Interiorly of the lamina this group of rays, refracted at its entrance, strikes the face 7a at an angle of $1/42.6$ radian and is reflected by total reflection in a symmetrical direction toward the emission face 41, where, in passing into the air, it is refracted downwardly, and takes an inclination equal to that which it had before its entrance but in the opposite direction, in such manner that this inclination becomes that of the rays $R_3$. As will be seen in the drawing, the rays $R_2$ which are reflected downwardly complement, on leaving the lamina, the group of rays comprised between $R_3a$ and $R_3b$ of those rays $R_3$ which traverse the lamina directly and which also occupy 65% of the thickness by reason of symmetry with the analogous group of rays $R_2a$ to $R_2b$. 35% of the rays $R_3$ are absorbed in the lower face, so that parts of each of the categories of descending rays correspond to smaller inclinations, which parts are smaller as the inclinations are smaller. It is, therefore, more than 65% of all of the descending rays which are utilized in this position, and actually the quantity of these rays is approximately 85%.

Likewise, all of the rays less ascending than the rays $R_2$ provide directly-utilized sheets of light which occupy more than 65% of the thickness of the lamina and sheets of rays which are thinner than 35% of the lamina which are utilized after downward reflection.

In Fig. 4b, the lamina is inclined in such a way that the emission of any ascending rays, no matter how slightly ascending, is prevented, so that the emitted light does not glare in the eyes of any person in front of the headlight whose eyes are higher than it is, not considering reflection from a wet road.

It should be noted that the emission of any ray which retains its inclination cannot be prevented without inclining the lamina sufficiently that no ray which is horizontal at the origin reaches the emission face 41 at a level lower than the upper edge of this face. In practice, therefore, it is necessary that all of the horizontal rays undergo total reflection downwardly. For this purpose it is necessary that any ray $R_1$ which penetrated into the lamina in grazing the upper edge 42 be refracted in such a way that it grazes the upper edge of the face 41, that is to say, that it is refracted in the diagonal plane of the sheet inclined $1/15$ radian to the faces. It is therefore necessary to calculate the angle of incidence $i1$ for which the angle of refraction has a value of $1/15$ radian, and to give to the lamina an inclination to this angle of incidence. The lamina 7, the face of which has been prolonged by dashed lines L, is therefore inclined in Fig. 4b in such a way that its inclination is given by:

$$\sin i = (n_2/n_1)(1/15) = 1.42/15 = 0.0947 = 1/10.56$$

which corresponds to an angle of 5 deg. 25 min. Thus the entire group of rays $R_1$ which can strike the face 7c inclined between the edges 42 and 45 strike the upper face 7a after refraction and is reflected downwardly at an angle equal to the imposed angle of refraction of $1/15$ radian. When this group of rays reaches the emission face of the lamina, it is refracted downwardly in passing into the air and takes an inclination symmetrical with that which it had relatively to the lamina before its entrance. Its absolute inclination is, therefore, two times that of the lamina, that is: $2(1/10.56) = 1/5.28$. If the headlight is one meter from the ground this group of rays reaches the ground at a distance of 5.28 meters.

Since the sine of the angle of refraction increases proportionally with the sine of the angle of incidence, and since all of the angles of incidence of the ascending rays are necessarily greater than that of the rays $R_1$, it is clear that all of the refracted parts of these more or less ascending rays encounter the upper mirror-like face of the lamina and are reflected downwardly. For the rays $R_2$, the inclination of $1/30$ radian of which is assumed to be maximum, we have:

$$\sin i_2 = 1/10.56 + 1/30 =$$
$$0.0947 + 0.0333 = 0.1280 = 1/7.82$$

whence $$\sin r_2 = \sin i \ (n_1/n_2) = 0.128/1.42 = 0.0902 = 1/11.1$$

which corresponds to about 5 deg. 10 min. and permits the refracted portion of the lower ray $R_2a$ which strikes at a point 43' of the face 7a to be determined. By passing through the lower edge of the emission face 41 of the lamina a parallel to this ray after its reflection at 43', there is found the point 44' of reflection at which will strike the ray $R_2d$ which is the highest of the rays $R_2$ forming a well-defined utilizable group of descending rays at the emission face of the lamina. Those of the rays $R_2$ which are higher are only utilized for diffuse illumination of the lower corrugated face after their reflection against the part of the face 7a comprised between the points 44' and 45. All of the other ascending rays, which are less inclined, and which are not represented, will strike the face 7a at points comprised between points determinable in the same manner as the points 43' and 44', but which will be farther apart the less they are inclined, so that there will be added to the two outcoming sheets of rays $R_1$ and $R_2$ as many reflected sheets of rays as there are different directions in the ascending rays coming from the reflector, and these sheets will have at their point of emission all of the thicknesses and all of the directions comprised between the thicknesses and the directions of the two sheets of rays $R_1$ and $R_2$.

As to the descending rays, their angles of incidence remain of the same sign as those of the ascending rays, due to the fact that their maximum inclination is smaller than that of the lamina. The smallest of these angles of incidence is that of the rays $R_3$ given by:

$$\sin i_3 = 1/10.56 - 1/30 =$$
$$0.0947 - 0.0333 = 0.0604 = 1/16.6$$

Accordingly, the angle of refraction $r_3$ is calculated: $\sin r_3 = 0.0604/1.42 = 0.0426 = 1/23.5$, whence $r_3 = 2$ deg. 26 min.

By passing through the upper edge of the face of departure 41 a parallel to the refracted lower ray $R_3a$ there is determined the thickness of a non-negligible group of those rays $R_3$ which depart under their initial inclination of $1/30$ radian downwardly, and reach the ground at a distance of 30 meters. On this sheet of light there are superposed other thinner sheets of rays which are less descending than the rays $R_3$, but depart with a very small downward inclination. These other light sheets, therefore, illuminate the road beyond 30 meters. Their thicknesses are fractions of that of the lamina and the differences between these fractions and the unit are the relative thicknesses of the number of sheets of light that strike the face 7a at angles comprised between the values of $r_3$ and $r_1$, so that their final inclinations are all smaller than the final inclination of the rays $R_1$, but nevertheless larger than that of the lamina, which they exceed at least by the value of $i_3$. The thickness of the represented stratum of departure of the rays $R_3$ is the fraction 0.36 of those of the sheet.

There is therefore obtained, in a position which prevents blinding of oncoming drivers, a significant beam of downwardly reflected rays which illuminates the road from 5.28 to 6.40 meters, and another descending beam of rays, not reflected, which reaches the ground at 30 meters and beyond.

For the purpose of modifying the relative importance of these two beams in such a way as to reinforce the long-carrying beam and to decrease their divergence by elevating the lower beam, we can decrease the thickness of the laminae relatively to their width. For example, for a width of 30 mm. there can be used a thickness of 1.0 mm., instead of the 2.0 mm. which corresponds to the ratio 1/15 of Figures 1 and 4 of the drawing, for the purpose of obtaining the ratio 1/30. Generally speaking, the thicknesses of the laminae may vary from a fraction of a millimeter, e. g. ¾ mm. to about three millimeters.

Fig. 5 represents the principal effects obtained under those conditions when the lamina has the inclination which makes the angle of refraction of the horizontal rays equal to $1/30$ radian. The inclination of the lamina is then half that which it is in Figure 4b, since: $\sin i = 1.42/30 = 1/21.1$. The angles of incidence of the rays $R_2$ and $R_3$ become: $\sin i_2 = 1/21.1 + 1/30 = 51.1/633 = 1/12.4$, and $$\sin i_3 = 1/21.1 - 1/30 + 8.9/633 - 1/711$$

whence we have for the corresponding angles of refraction: $\sin r_2 = (1)/(12.4 \times 1.42) = 1/17.6$, and $$\sin r_3 = (1)/(71.1 \times 1.42) = 1/101$$

These values enable the same constructions as in Figure 4b but give another distribution of the principal sheets of light rays. The sheet of rays $R_3$ which strikes the road at 30 meters takes the same thickness in absolute value as in Figure 4b, but occupies a fraction two times greater than the thickness of the lamina, that is, 0.72 instead of 0.36. The points of reflection of the rays $R_2$ designated by 43" and 44" are closer together than the corresponding points 43' and 44', so that the utilized portion of the ascending rays at the origin is decreased to the profit of the portion of the descending rays which are finally utilized with their initial inclination. The most important of the sheets of rays reflected downwardly, that of the initially-horizontal rays $R_1$, still has a fairly-great final-inclination, amounting to twice the inclination of the lamina, that is, 1/10.56, so that it reaches the ground at about ten meters from the vehicle.

The phenomenon of the diffraction of the rays which graze the edge of a surface, which is neglected in the above discussion which is based on the approximate hypothesis of the rectilinear propagation of light, has the effect of merging together the edges of the several sheets of light considered above, so that the horizontal limit of these sheets does not remain clear at a great distance from the headlight. Accordingly, a person positioned in front of the headlight, and whose eyes are higher than it, may receive upwardly-diffracted rays, even if the conditions of Figure 5 are satisfied. Moreover, if we apply to the diffracted rays the theorem of inverse propagation of rays, we see that the person, instead of seeing the lower furrowed and diffusing face of a lamina in the direction of diffracted rays terminating at his eye and grazing the upper edge of the lamina, sees these rays as coming from the reflector and the filament. From this it follows that there still exists a certain amount of glare although it is much smaller than that which the same person would have experienced before the inclination of the disk. Specifically, these diffracted rays belong to the fringes of the beam coming from each of the laminae, and these fringes are less luminous than the principal beam.

Thus, the driver of a vehicle approaching the headlight, which he has first seen from a distance in the position of Figure 4a at full illumination, clearly perceives a decrease in the glare of the light at the instant that the disk is inclined as in Figure 5, although he may still receive some diffracted rays which have passed above the height of the headlight. This residual glare due to the diffraction diminishes rapidly as the two vehicles come closer to each other, because it is due to the fringes of light which are more and more elevated and hence less and less luminous. Finally, it disappears completely at a distance of about 20 meters. It is an advantage from the physiological viewpoint that the cause of the glare decreases only gradually.

The driver of the vehicle with the headlight described up to this point may find that the illumination of the road at 30 meters and beyond is less than between 10 and 20 meters. This may be due to the fact that the upper beam is less strong than the others, or that its diffraction increases with increasing distance, or especially that it is at least as divergent horizontally as vertically while the width of the road is constant, so that at the distance at which the luminous beam becomes wider than the road only a part of it falls on the road. The impression of less illumination at great distances can be still further reinforced physiologically if the road is really more illuminated at shorter distances, because the eye, accommodating itself of this greater illumination, cannot accommodate itself to the weaker distant illumination.

Figures 6 and 7 show modified forms of construction intended to improve these conditions.

Figure 6 shows the front portion of the laminae 7 inclined as in Figure 5, and modified in a manner to prevent the rays from being diffracted upwardly in grazing the upper edges of the front faces, which edges are in the embodiment of Figures 1 and 4 the lines of intersection of the front faces and the upper faces 7a. In the modified form of Figure 6 this edge is replaced by the intersection of the face 7a and a bevel 46 cutting the upper front corner of each of the laminae 7. A horizontal line H shows the downward inclination of a ray $R_5$ less inclined than the faces 7a and 7b. The analogous upper rays are all reflected by the face 7a. The ray shown is taken to be the first of those having a non-reflected direction, that is, one which, in the absence of the bevel 46, would graze the edge of the mirror-like face without touching it, and which would be diffracted upwardly. This diffraction is avoided because the ray strikes at the level of the bevel 46 and forms, with the perpendicular N to the bevel at the point of incidence, an angle $\alpha$ which is smaller than the maximum angle of refraction of a ray passing from the air into the material of which the lamina 7 is made. This ray is therefore, refracted in passing into the air in forming with the above-mentioned perpendicular an angle $\beta$ which is less than 90 deg. The same thing would also be true of rays parallel with the faces 7a and tangential to these faces, or very nearly so. The refracted portions of such rays passing into the air are, therefore, spaced at their origin from the edge 47 which the face 7b forms with the front face. Their diffraction can therefore be diminished or annulled, and, if it is not diminished, it no longer has a blinding or glaring effect, in view of the fact that these rays are now steeply inclined downwardly.

The bevel 46, instead of being polished as is the case above, can be unpolished. In this case, it would then be the diffusion of the light which it received which would prevent diffraction.

Fig. 7a shows a modified arrangement of the filament 4 in a side-elevation view and Fig. 7b shows it in end view. This filament is disposed along the axis A of the reflector, and extends a substantial distance on each side of the focus relatively to the average effective vectoral ray of the reflector, so that the rays coming from its ends are reflected along inclinations equal in absolute value to that which the laminae 7 have when they satisfy the conditions of Figures 4b and 5.

A cylindrical reflector 48, similar to those which are known in lamps having two filaments, is disposed below the front part 4a of the filament coaxially with the axis A but extending over only a fraction of the length of the filament. An identical reflector 49 is disposed symmetrically above the other end 4b of the same filament.

The purpose of this arrangement is that the two upper and lower halves of the reflector furnish more rays reflected downwardly than ascending rays, since the latter can only come from the central part of the filament, at the same time as the descending rays. This arrangement is dictated by the characteristics of the action shown in Figure 5, where it is seen that the long-carrying beam is formed by initially-descending rays which traverse the lamina 7 directly without undergoing reflection downwardly. It should be noted that the filament 4 of Figure 7 is constantly energized regardless of the position of the disk 7—29.

In the event that it is desired to diminish the luminosity of the furrowed faces 7b by the interposition of a dark coating whose binding material has an index of refraction very little less than that of the sheets, there can be placed in contact with the polished faces 7a thin metal foils, e. g. aluminum foils 8' of a thickness less than 1/100 mm. Alternatively, the faces 7a can be metallized directly, in accordance with known metallizing techniques. However, the total reflection without this modification is still assured with the small inclinations provided for the rays if the index of refraction of the binding material is only slightly less than that of the laminae.

The two parts 4a and 4b of the filament of Figure 7a, or two corresponding separate filaments, could be separated by a space containing the focus, and in which there is mounted a transverse and horizontal filament having a diameter selected in such a way as to furnish an important flux of rays with very small divergence upwardly and downwardly, and having a length which is of the same order of magnitude as the diameter. This filament would preferably be fed at the same time as the axial filament, while being mounted either in series or in parallel therewith. The reflector could be limited to a sector of a paraboloid of revolution.

A lens could be placed in front of the light source with its focus at the light source in such a way that it transforms the conical flux into a parallel beam. The lens could also be formed as an integral part of the lamp bulb.

It will be apparent that various other changes and modifications may be made in the embodiments of the invention above-described and shown in the drawings in addition to those indicated above. For example, in the embodiment of Fig. 6, the lower edge of the front face of each lamina may be beveled as well as the upper edge. It will be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

This application is a continuation-in-part of co-pending application, Serial No. 210,962, filed February 14, 1951, and now abandoned.

What we claim and desire to secure by Letters Patent is:

1. A vehicle headlight comprising, in combination, a parabolic reflector, a source of light centered at the focus of said reflector, and means for modifying the paths of the light rays leaving said light source and reflector for the purpose of diminishing the glaring effect produced by the rays upon the driver of an approaching vehicle, said means comprising a front extension to said reflector, a rigid disk formed from a plurality of laminae of a solid transparent material, said laminae being assembled with their lateral edges forming the front and rear faces of the disk, a frame holding the assembly of laminae to define said disk, said disk being sufficiently large that it receives at least the greater part of the light rays reflected by the reflector, said laminae having their upper faces polished and their lower faces furrowed in a direction parallel to their edges, said disk being mounted for rotation about a horizontal axis parallel with its faces and the faces of the said laminae, said axis being perpendicular to the optical axis of the headlight, said laminae having a thickness comprised between $\frac{1}{15}$ and $\frac{1}{40}$ of their width measured in a vertical plane parallel to the optical axis and having their front and rear lateral edges polished over at least the greater part of their height, actuating means for adjusting the angular position of the disk in said extension.

2. A vehicle headlight as defined in claim 1, wherein dark material is interposed between the laminae and wherein metal foils are interposed between the upper faces of the laminae and said dark material.

3. A vehicle headlight as defined in claim 1, wherein the front face of each of the laminae is formed with a bevel at its upper edge, said bevel cutting the plane of the upper face at an acute angle greater than 45 degrees, said bevel occupying a minor proportion of the height of the front face of said laminae.

4. A vehicle headlight as defined in claim 3, wherein said bevel occupies $\frac{1}{8}$ the thickness of the laminae.

5. A vehicle headlight as defined in claim 3, wherein the bevel is polished.

6. A vehicle headlight as defined in claim 1, wherein the light source is a lamp having a filament directed along the axis of revolution of the parabolic reflector and extends by amounts substantially equal before and behind the focus of the reflector, and wherein two cylindrical reflectors are symmetrically disposed along said axis, one below the front half of the said filament, and the other above the rear half, and extending over equal portions of each of the filament halves inwardly from opposite ends of the filament.

7. A headlight for a motor vehicle as defined in claim 1, wherein said plurality of solid transparent laminae are formed from a synthetic resinous material.

8. A headlight as defined in claim 1, wherein said laminae have a thickness within the range of a fraction of a millimeter to 3 millimeters and a width which is fourteen to seventeen times said thickness.

References Cited in the file of this patent

UNITED STATES PATENTS

| | | |
|---|---|---|
| 1,100,484 | Inman | June 16, 1914 |
| 1,269,548 | Palmer | June 11, 1918 |
| 1,442,463 | Bowman | Jan. 16, 1923 |
| 1,537,219 | Berg | May 12, 1925 |
| 1,633,387 | Shippey et al. | June 21, 1927 |
| 2,539,927 | Ramminger | Jan. 30, 1951 |

FOREIGN PATENTS

| | | |
|---|---|---|
| 199,033 | Great Britain | 1924 |
| 641,093 | France | Apr. 10, 1928 |
| 518,675 | Great Britain | Mar. 5, 1940 |